A. SHUNK, Sr.

Plow.

No. 71,234.

Patented Nov. 19, 1867.

Witnesses:
S. R. Harris
J. M. Lindsey

Inventor:
A. Shunk, Sen.

United States Patent Office.

ADAM SHUNK, SR., OF BUCYRUS, OHIO.

Letters Patent No. 71,234, dated November 19, 1867.

---

IMPROVEMENT IN PLOUGHS.

---

*The Schedule referred to in these Letters Patent and making part of the same.*

---

TO ALL WHOM IT MAY CONCERN:

Be it known that I, ADAM SHUNK, Sr., of Bucyrus, in the county of Crawford, and State of Ohio, have invented new and useful Improvements on the Plough; and I do hereby declare that the following is a full, clear, and exact description of the same, reference being had to the annexed drawings, making a part of this specification, in which—

Figure 1 is a perspective view of the entire plough, with my improvements thereon.

Figure 2, view of the land-side, with the adjustable heel-piece.

Figure 5 is a view of the brace D, extending from said lateral brace $c$ to the beam.

To enable others skilled in the art to make and use my invention, I will proceed to describe its construction and operation, reference being had to the annexed drawings, making part of these specifications.

Figure 1:
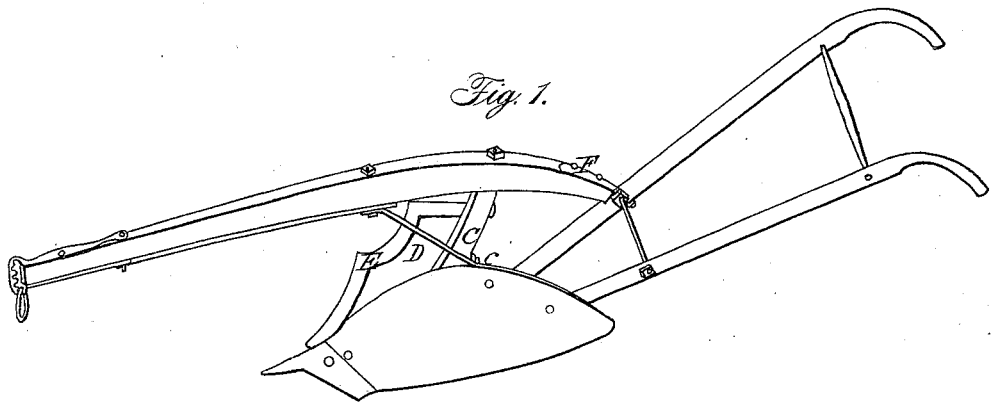
Figure 2:
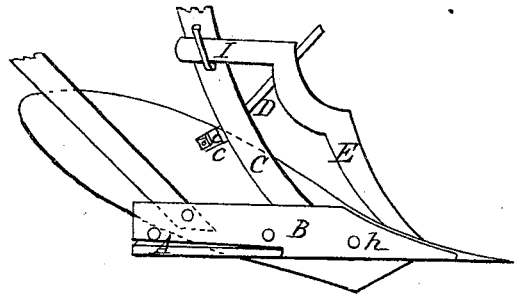

I construct my plough mainly in the ordinary way, and apply to the rear part and lower edge of the land-side my adjustable heel-piece, A, fig. 2, which is swivelled by means of a bolt at $a$, and at $d$ there is a slot, by means of which the rear end of said heel-piece may be raised or lowered, and kept to the desired position by the bolt and set-screw, thus regulating the depth of the furrow to be ploughed, and also providing against the expense and delay for repairs occasioned by the inevitable wear of the lower edge of the rear end of ordinary land-sides.

Figure 3:
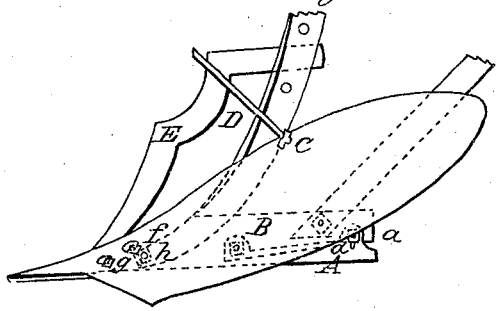
Figure 3 is a view of the inner side of the land-side, with the wing or flange $b$.
Figure 4:
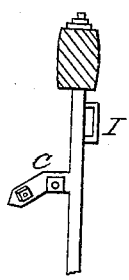
Figure 4 is a detached view of the post, having the lateral brace $c$.

My land-side B, fig. 3, is so constructed with said flange or wing $b$, that said wing operates as a mutual support and brace for the share, being fastened thereto at $f$ by a bolt and nut, and for the mould-board, being fastened thereto by a bolt and nut at $g$, and the whole are further braced and supported by the post C, fig. 4, being attached and fastened to said land-side by a bolt and nut at $h$.

My post C possesses the advantage of its attachment by a bolt and nut to the land-side B, without the weight of the heavy post ordinarily cast as a solid part of said land-side, the ploughs of my construction, with the improvements herein mentioned, being nearly forty pounds lighter than the ordinary plough of the same capacity.

My brace D, fig. 5, is an iron rod or bar, set at an angle of about forty-five degrees with the rear of the beam. The upper end of the brace is flattened, and attached to the beam by a bolt. The lower end passes through said lateral brace $c$, and is secured by a nut screwed on said lower end against the opposite side of said lateral brace $c$, thus giving the whole plough a central draught, saving largely in the power required to operate it, and contributing largely toward bracing the entire plough firmly to its work.

Figure 6:
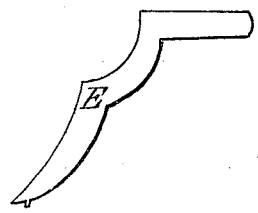
Figure 6 is a detached view of the coulter or cutter.

My cutter or coulter E, fig. 6, is set at its lower end by a teat or projection into a corresponding cavity in the share, and its upper end is set and wedged into a staple on the upper part of said post C, at $i$. My coulter has an inward curve, as shown in the drawings, which curve is above that part of the cutter which cleaves the ground. This curve operates to receive the accumulating long grasses, weeds, dead corn-stalks, and other trash, which ordinarily choke the common plough, and it relieves the same from interfering with the work of the coulter, whilst its shape and continuous curve prevent said weeds and other obstructions from lodging against the upper part of said brace D, and between the upper and horizontal part of said coulter and the beam; but, on the contrary, said weeds and other trash are taken from the curvature of said coulter by the turning furrows when the plough is at its work.

Figure 7:
Figure 7 is a view of the plate or tail-piece attaching the handle to the beam.

My attachment F, fig. 7, consists of an iron rod or bolt, which passes through a hole for that purpose in the handle at $j$, and having a nut screwed on the end of said bolt against the rear side of said handle, as shown in the drawings.

What I claim as my invention, and desire to secure by Letters Patent, is—

1. The construction of land-sides of ploughs with flanges in the form herein described, and for the purposes herein mentioned.

2. The construction of plough-coulters with an inward curve above that part which cleaves the ground, in the form herein described and for the purposes herein mentioned.

A. SHUNK, SR.

Witnesses:
GEO. G. MERIMAN,
G. W. DE CAMP.